United States Patent [19]
Karmin

[11] 3,929,462
[45] Dec. 30, 1975

[54] PATTERN TRAINING APPARATUS

[76] Inventor: Irving Karmin, 3915 Orloff Ave., Bronx, N.Y. 10463

[22] Filed: Oct. 21, 1974

[21] Appl. No.: 516,786

[52] U.S. Cl.............................. 35/37; 35/26; 33/25 B
[51] Int. Cl.² ....................... G09B 11/00; B43L 13/10
[58] Field of Search......... 35/36, 37, 26, 29 R, 29 E; 33/23 R, 23 F, 23 G, 23 H, 25 R, 25 B

[56] References Cited
UNITED STATES PATENTS

| | | | |
|---|---|---|---|
| 12,048 | 12/1854 | Ames | 35/37 X |
| 12,049 | 12/1854 | Ames | 35/37 X |
| 310,186 | 1/1885 | Diamond | 33/25 B |
| 350,027 | 9/1886 | Wang | 33/25 B |
| 1,073,240 | 9/1913 | Johnson | 33/23 F |
| 2,143,426 | 1/1939 | Wride | 35/36 |
| 2,761,223 | 9/1956 | Legeai | 35/29 E |
| 3,425,140 | 2/1969 | Dillon et al. | 35/36 |

*Primary Examiner*—Wm. H. Grieb
*Attorney, Agent, or Firm*—Irving Karmin

[57] ABSTRACT

A pair of styli are arranged side by side and positioned over recording materials. The styli can be adjusted to assume the position of a hand held writing instrument if required or a simpler position if adequate. The support for the stylus pair is mounted on a primary and secondary parallelogram assembly arranged to permit the styli to move in a direction parallel to the recording material attached to the base. Different arrangements of secondary parallelograms permit the styli to move in a direction perpendicular to the recording material. In use a student grasps one stylus and the teacher the other. The student is then able to follow all the motions involved in forming the pattern and thus enable his arm and hand muscles to be exercised, as well as develop kinesthetic patterns within the muscle groups.

4 Claims, 6 Drawing Figures

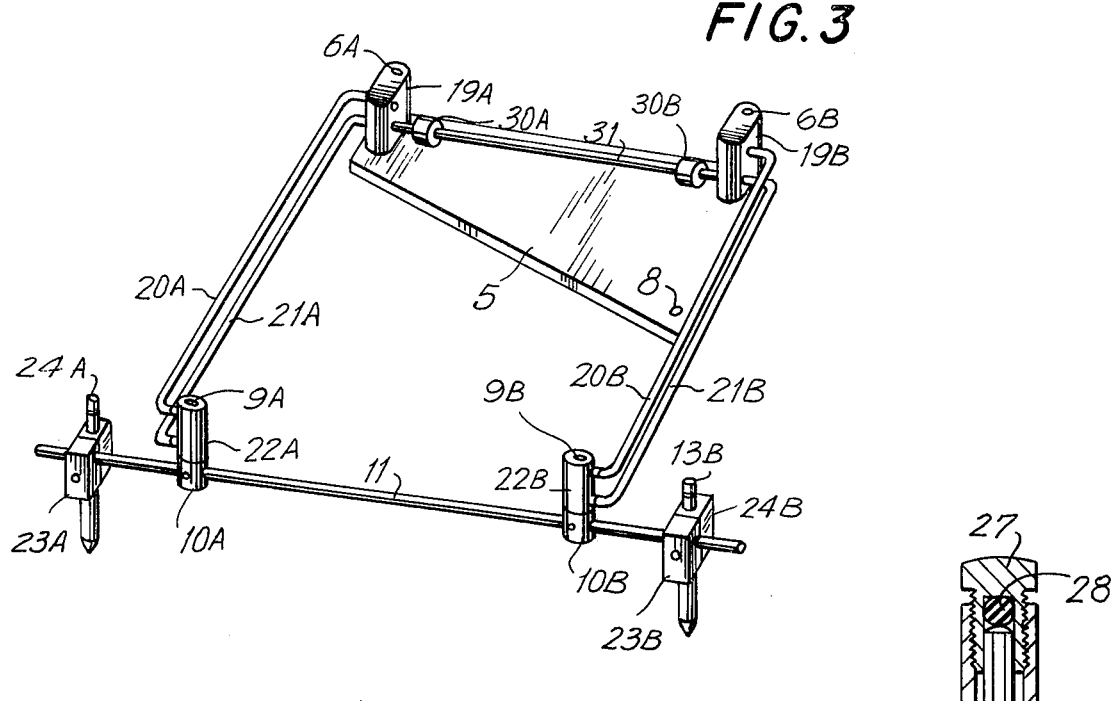
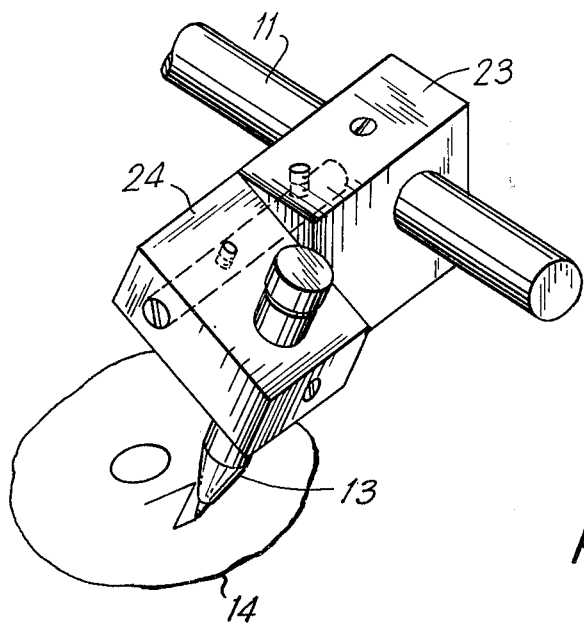
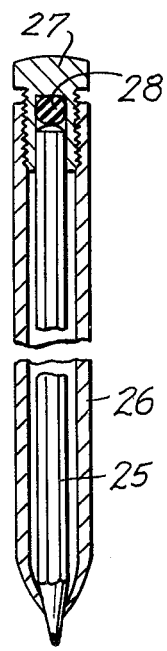
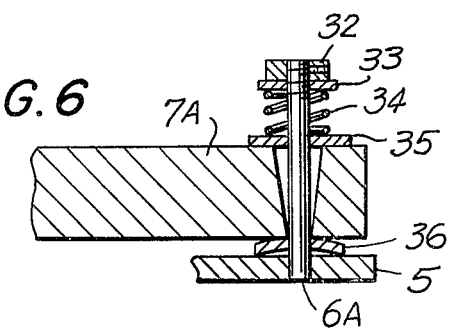

PATTERN TRAINING APPARATUS

BACKGROUND OF INVENTION

Teachers of handwriting have employed two main techniques in order to convey to the student the kinesthetic sense required to learn to control a handwriting or drawing instrument. Methods employed to date require the teacher putting his hand on the students hand or grasping the students wrist and guiding the students pencil in the formation of letters, words or patterns. Another technique is to provide the student with a template which is traced by the pupil until he develops a kinesthetic sense. The foregoing techniques do not permit the student to operate in a natural environment which is simply holding his writing instrument and writing without feeling the presence and distraction of the teachers hand. A template does not permit the student to feel the fine control movements required by the hand and is also a distraction.

Teaching left-handed people to write will also benefit from this patterning apparatus since many writing problems of left-handed persons stem from their left hand being guided by the hand of a right-handed teacher with attendant confusion.

Further, rehabilitation of a person losing the ability to write due to stroke, etc. will be hastened by quickly permitting him to develop other methods of controlling the hand.

SUMMARY OF INVENTION

This invention pertains to an improved means for training students in the correct development of kinesthetic patterns necessary to properly use various muscles such as those of the upper and lower arm, wrist, hand and fingers in order to write or draw in the conventional sense.

One object of the invention is to produce a compact apparatus which accurately transmits movement at one stylus to movement at another stylus without the introduction of appreciable resistance to motion.

Another object of the invention is to provide a device with uniform resistance to motion in any direction within the plane of movement.

A further object of the invention is to provide an arrangement whereby the spacing between styli can be varied without adjustments to the apparatus arms.

A still further object of the invention is to provide a flexible connection between styli which will transmit motion in a direction perpendicular to the parallelogram plane of motion.

An additional object of the invention is to provide a means for fixing the styli to the apparatus which means permits adjustment of the stylus for the convenience of the user.

Another object of the invention is to provide a visible recording of the pattern traced by the student to provide visual feedback in order for the student to see the movements he is performing.

BRIEF DESCRIPTION OF DRAWINGS

FIG. 3 Perspective view of secondary parallelogram which permits styli to retain original orientation as they are lifted.

FIG. 4 Perspective view of stylus holder which permits adjustment of the stylus.

FIG. 5 Cross section of stylus construction.

FIG. 6 Cross section of pivot detail, Section 6—6 of FIG. 1.

DESCRIPTION OF PREFERRED EMBODIMENTS

Figure 1:
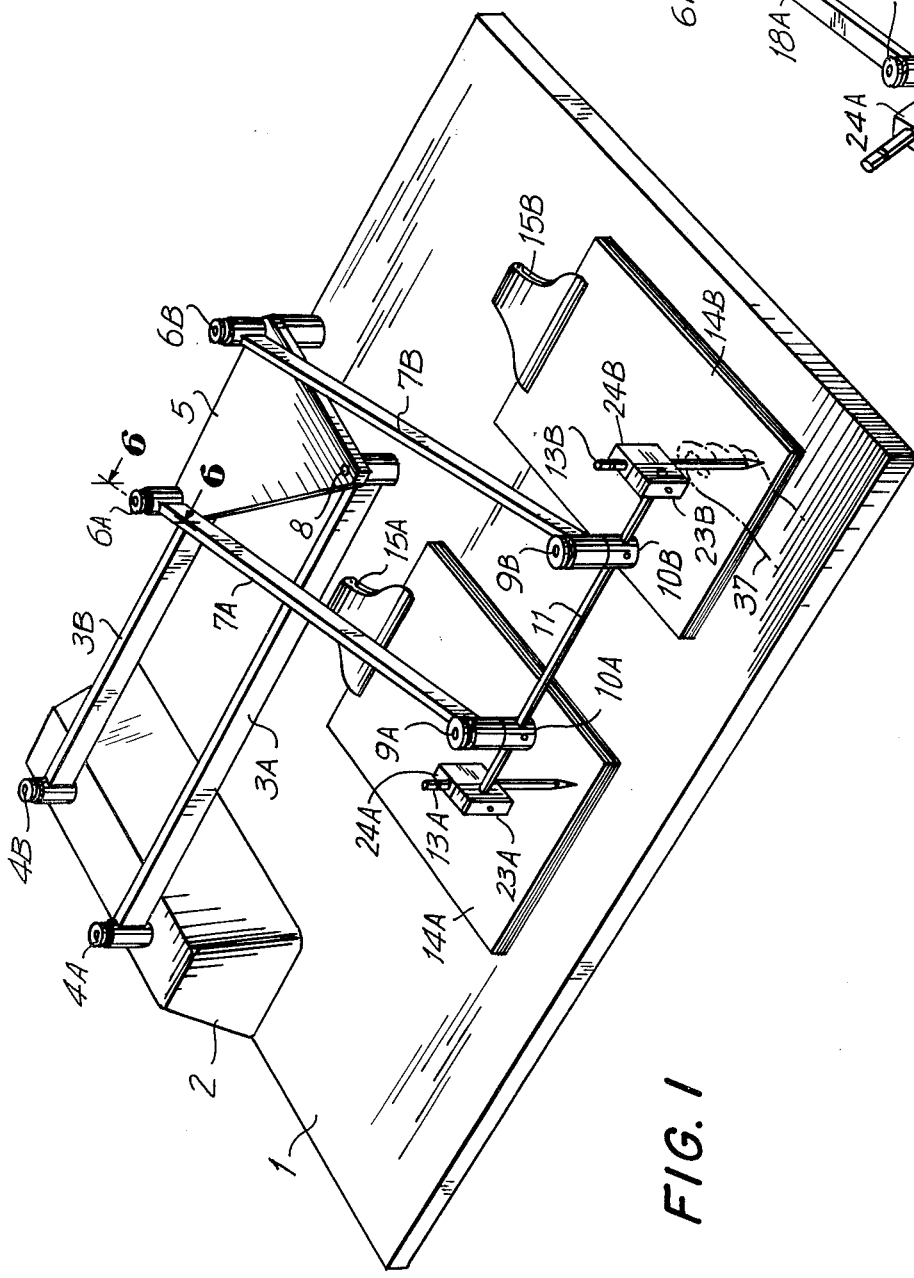
FIG. 1 Perspective view of patterning apparatus showing arrangement of elements. Styli can be lifted substantially independent of each other.

In the following descriptions like reference numerals are used througout the various views to designate like parts and number letter combinations are used to designate parts which have similar functions.

The several embodiments described employ similar parts with like functions such as base, primary parallelogram, coupling plate, transverse support rod and styli. The embodiments vary in the description of the secondary parallelogram and its functioning, and it will be evident to anyone skilled in the art how the various forms of secondary parallelogram co-act with the primary parallelogram.

FIG. 1 shows a first preferred embodiment wherein a base 1 has attached to it a support 2 which serves to raise the parallelogram assemblies a convenient height above base 1. Dowel pins 4A and 4B are fixed to support 2, the distance between dowel pins 4A and 4B form one arm of the primary parallelogram. Pivotally connected to dowel pins 4A and 4B are the second ends of primary arms 3A and 3B; the first end of these arms are pivotally connected to dowel pins 8 and 6B fixed to coupling plate 5, and the distance between dowel pins 8 and 6B forms another arm of the primary parallelogram. The primary parallelogram is thus formed by primary arms 3A and 3B in conjunction with the distance between dowel pins 4A and 4B and the distance between dowel pins 8 and 6B. Fixed to coupling plate 5 are a second set of dowel pins 6A and 6B, the imaginary line drawn between dowel pins 6A and 6B being approximately 90° from the imaginary line drawn between dowel pins 4A and 4B. In order to form a compact arrangement, the primary and secondary parallelograms have a common dowel pin, 6B, fixed to coupling plate 5. The distance between dowel pins 6A and 6B forms one arm of the secondary parallelogram. Pivotally connected to dowel pins 6A and 6B are the second ends of secondary arms 7A and 7B each having a partially elongated hole at the second end allowing the secondary arms to pivot about dowel pins 6A and 6B as well as move in a direction parallel to the dowel pins. Reference to FIG. 6, which shows a section 6—6 through dowel pin 6A, arm 7A and coupling plate 5, also shows the hole in secondary arm 7A elongated in the direction of the arm's long axis and elongated in a tapered manner as shown in order to permit the movement described. Locknut 32, upper flat washer 33, spring 34 and intermediate flat washer 35 together with lower convex washer 36, all cooperate in permitting a pivoting and up and down motion about dowel pin 6A. Secondary arm 7B has a similar hole at its second end to permit the same type of movement as secondary arm 7A. The first end of secondary arm 7A and 7B are pivotally connected to dowel pins 9A and 9B which are fixed to support rod connectors 10A and 10B which in turn are adjustably fixed to the transverse support rod 11. The secondary parallelogram is formed by secondary arms 7A and 7B in conjunction with the distance between dowel pins 6A and 6B and dowel pins 9A and 9B. Adjustably fixed to transverse support rod 11 are the first stylus clamp block 23A and first stylus clamp block 23B. Pivotally and adjustably fixed to first stylus clamp block 23A is second stylus clamp block 24A which has adjustably fixed to it stylus 13A, pivotally and adjustably fixed to first stylus clamp block 23B is second stylus clamp block 24B which has adjustably fixed to it stylus 13B. The two styli record their movement on recording materials 14A and 14B. Recording materials 14A and 14B can be replaced by manipulating clamp 15A and 15B which is fixed to base 1. Hand 37 shows how the stylus may be held, other methods of holding are possible and may be desirable depending on the orientation of the stylus.

Figure 2:
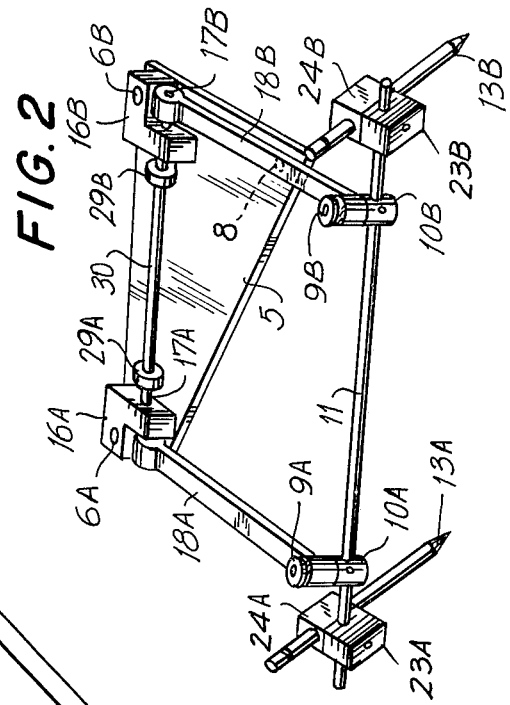
FIG. 2 Perspective view of secondary parallelogram which permits lifting of both styli from either stylus position.

FIG. 2 shows the secondary parallelogram used with the second preferred embodiment. Coupling plate 5 is attached to the primary parallelogram arms as described in FIG. 1, pivotally connected to dowel pins 6A and 6B are the connector blocks 16A and 16B. Pivotally connected to the connector blocks 16A and 16B are also shafts 17A and 17B which are fixed to the seconds ends of secondary arms 18A and 18B. The other ends of shafts 17A and 17B are each connected to flexible couplings 29A and 29B which are connected together by telescoping splined shaft 30. The first end of secondary arm 18A and 18B are pivotally connected to dowel pins 9A and 9B which are fixed to support rod connectors 10A and 10B which in turn are adjustably fixed to to the transverse support rod 11. Adjustably fixed to transverse support rod 11 are first stylus clamp block 23A and first stylus clamp block 23B. Pivotally and adjustably fixed to first stylus clamp block 23A is second stylus clamp block 24A which has adjustably fixed to it stylus 13A. Pivotally and adjustably fixed to first stylus clamp block 23B is second stylus clamp block 24B which has adjustably fixed to it stylus 13B. The two styli record their movements on recording materials 14A and 14B. Recording materials 14A and 14B can be replaced by manipulating clamp 15A and 15B which is fixed to base 1. Hand 37 shows how the stylus may be held, other methods of holding are possible and may be desirable depending on the orientation of the stylus.

FIG. 3 shows the secondary parallelogram used with the third preferred embodiment. Coupling plate 5 is attached to the primary parallelogram arms as described in FIG. 1, pivotally connected to dowel pins 6A and 6B are rear connector blocks 19A and 19B. In each rear connector block are two transverse holes arranged to be spaced vertically. Inserted in the transverse holes of rear connector block 19A are two U shaped arms, 20A and 21A, pivotally connected to the transverse holes of rear connector block 19A and also pivotally connected to two transverse holes in front connector 22A which is pivotally fixed to dowel pin 9A. Similarly, rear connector block 19B has pivotally fixed to its vertically disposed transverse holes two U shaped arms, 20B and 21B, both pivotally connected to front connector 22B which is pivotally connected to dowel pin 9B. U shaped arms 21A and 21B each have a flexible coupling 30A and 30B attached. The flexible couplings are interconnected by telescoping splined shaft 31. Dowel pins 9A and 9B are fixed to support rod connectors, 10A and 10B which in turn are adjustably fixed to the transverse support rod 11. Adjustably fixed to transverse support rod 11 are first stylus clamp block 23A and first stylus clamp block 23B. Pivotally and adjustably fixed to first stylus clamp block 23A is second stylus clamp block 24A which has adjustably fixed to it stylus 13A, pivotally and adjustably fixed to first stylus clamp block 23B is seocnd stylus clamp block 24B which has adjustably fixed to it stylus 13B. The two styli record their movements on recording materials 14A and 14B. Recording materials 14A and 14B can be replaced by manipulating clamp 15A and 15B which is fixed to base 1. Hand 37 shows how the stylus may be held, other methods of holding are possible and may be desirable depending on the orientation of the stylus.

FIG. 4 is a perspective view of a typical stylus holder where it is possible to adjust the angle between the stylus 13 and recording material 14 to assume a position such as shown in FIGS. 1, 2 & 3 or a postion such as shown in FIG. 4. First stylus clamp block 23 is adjustably fixed to transverse support rod 11. Pivotally fixed, in an adjustable manner to first stylus clamp block 23 is second stylus clamp block 24 to which is adjustably fixed stylus 13.

FIG. 5 shows a cross section of a stylus which consists of a rigid pen holder 26 and a pen 25 inserted therein. The pen is locked into the pen holder 26 by screwing cover 27 down on pen 25 so as to compress resilient means 28. This stylus is more rigid than a conventional writing instrument, and is also easier for the user to hold.

While I have shown several preferred embodiments, it is understood that the subject invention is not limited to these embodiments but that these embodiments were given for illustrative purposes only. Other possible applications within the scope of the invention are possible.

I claim:

1. An educational apparatus for patterning manual movements, comprising:
    a pair of styli adjustably fixed to a transverse support rod which has fixed to itself a set of dowel pins pivotally connected to the first end of;
    a pair of secondary arms, the second end of each arm is pivotally connected to the first pair of dowel pins on;
    a coupling plate and a second pair of dowel pins on the coupling plate is pivotally attached to;
    a pair of primary arms having holes at each end of each arm, the holes furthest from the coupling plate being pivotally attached to a support having a pair of dowel pins and attached to;
    a base having a plane surface, to which is attached;
    a recording material for making the pattern formed visible.

2. An educational apparatus for patterning manual movements, comprising:
    a pair of styli spaced an adjustable distance apart and adjustable in angle about a transverse support rod which has fixed to itself a set of dowel pins pivotally connected to the first end of;
    a pair of secondary arms, the second end of each arm having a tapered slot hole to permit pivotal connection and freedom for the first end of the arm to move in a vertical direction, the second end of each arm is pivotally connected to a first pair of dowel pins on;
    a coupling plate and a second pair of dowel pins, one pin of which is common to the first pair on the coupling plate, is pivotally attached to;
    a pair of primary arms having holes at each end of each arm, the holes furthest from the coupling plate being pivotally attached to;

a support, having a pair of dowel pins and attached to;

a base having a plane surface, to which is attached;

a recording material for making the pattern formed visible.

3. An educational apparatus for patterning manual movements, comprising:

a pair of styli spaced an adjustable distance apart and adjustable in angle about a transverse support rod which has fixed to itself a set of dowel pins pivotally connected to the first end of;

a pair of secondary arms pivotally connected to a pair of connector blocks by a pair of dowel pins fixed to the second end, the pins being interconnected by flexible and extensible means so as to permit each of the secondary arm assemblies of secondary arm and connector block to be pivotally connected to the respective dowel pin on;

a coupling plate and a second pair of dowel pins, one pin of which is common to the first pair on the coupling plate, is pivotally attached to;

a pair of primary arms having holes at each end of each arm, the holes furthest from the coupling plate being pivotally attached to;

a support having a pair of dowel pins and attached to;

a base having a plane surface, to which is attached;

a recording material for making the pattern formed visible.

4. An educational apparatus for patterning manual movements, comprising:

a pair of styli spaced an adjustable distance apart and adjustable in angle about a transverse support rod which has fixed to itself a set of dowel pins pivotally connected to a pair of front connector blocks forming the first end of;

a pair of secondary arm assemblies, each secondary arm assembly consisting of two U-shaped arms, pivotally and separately connected to the front connector block and a rear connector block to form a parallelogram, a pair of U-shaped arms, one from each secondary arm, are interconnected by flexible and exstensible means to provide for coaction of the secondary pair of arms, each rear connector block having a hole for pivotal attachment to a first pair of dowel pins on;

a coupling plate and a second pair of dowel pins, one pin of which is common to the first pair on the coupling plate, is pivotally attached to;

a pair of primary arms having holes at each end of each arm, the holes furthest from the coupling plate being pivotally attached to;

a support having a pair of dowel pins and attached to;

base having a plane surface, to which is attached;

a recording material for making the pattern formed visible.

* * * * *